(12) United States Patent
Chen et al.

(10) Patent No.: US 7,564,000 B2
(45) Date of Patent: Jul. 21, 2009

(54) ELECTRONIC DEVICE

(75) Inventors: I-Tai Chen, Taipei Shien (TW); Jui-Ting Tsai, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 573 days.

(21) Appl. No.: 11/421,077

(22) Filed: May 31, 2006

(65) Prior Publication Data

US 2007/0146982 A1  Jun. 28, 2007

(30) Foreign Application Priority Data

Dec. 27, 2005 (TW) .............................. 94146693 A

(51) Int. Cl.
*H01H 9/00* (2006.01)
(52) U.S. Cl. .................. 200/296; 200/293; 200/341
(58) Field of Classification Search ......... 200/293–296, 200/341; 361/680, 681; 341/20, 22; 345/156, 345/168–170; 362/23, 24, 95, 285, 295
See application file for complete search history.

(56) References Cited

U.S. PATENT DOCUMENTS

| | | | | | |
|---|---|---|---|---|---|
| 5,604,661 | A | * | 2/1997 | Nagao | 361/643 |
| 5,813,520 | A | * | 9/1998 | Reier et al. | 200/343 |
| 6,002,093 | A | * | 12/1999 | Hrehor et al. | 200/345 |
| 6,160,232 | A | * | 12/2000 | Lin | 200/341 |
| 6,914,206 | B2 | * | 7/2005 | Mukougawa | 200/556 |
| 7,268,312 | B2 | * | 9/2007 | Chen | 200/343 |
| 7,348,511 | B2 | * | 3/2008 | Chen et al. | 200/296 |
| 7,394,033 | B2 | * | 7/2008 | Kim | 200/296 |
| 7,426,105 | B2 | * | 9/2008 | Peng et al. | 361/679 |
| 7,485,820 | B2 | * | 2/2009 | Zhang et al. | 200/296 |

* cited by examiner

*Primary Examiner*—Michael A Friedhofer
(74) *Attorney, Agent, or Firm*—Thomas, Kayden, Horstemeyer & Risley

(57) ABSTRACT

An electronic device comprises a housing, a pillar and a fixing unit. The housing comprises a side-wall, an opening and a first positioning portion, wherein the opening is formed on the side-wall, and the first positioning portion is disposed in the housing corresponding to the side-wall. The fixing unit comprises an arm, and a second positioning portion, wherein the pillar is disposed on the arm, the second positioning portion is disposed on an end of the arm, the pillar is inserted into the opening to prevent the fixing unit from moving in a first direction and a second direction, the first direction perpendicular to the second direction, and when the fixing unit is in a fixing orientation, the second positioning portion contacts the first positioning portion, the first positioning portion prevents the fixing unit from moving in a third direction perpendicular to the first and second directions.

8 Claims, 8 Drawing Sheets

ELECTRONIC DEVICE

BACKGROUND OF THE INVENTION

1. Field of the Invention

The invention relates to an electronic device, and in particular to an easily assembled electronic device.

2. Description of the Related Art

FIG. 1a shows a conventional electronic device 10 comprising a housing 1 and a circuit board 2 disposed therein. FIG. 1b is an enlarged view of portion A of FIG. 1a, wherein the electronic device 10 further comprises a fixing unit 3 and a pillar (lamp) 5. Conventionally, the pillar 5 is fixed to the fixing unit 3, and the fixing unit 3 is fixed on the side-wall 6 by bolt 4. The pillar 5 is thus fixed on the side-wall 6. FIG. 1c shows another structure for fixing the pillar 5 to the side-wall 6, wherein the fixing unit 3 is thermally welded to the side-wall 6 via thermal welding portion 4'.

However, conventionally, when an operator assembles the pillar 5 to the side-wall 6, a tool must be extended into the housing 1 to fix the bolt 4 or heat the thermal welding portion 4'. Thus, the conventional assembly process is complex and assembly time increased.

BRIEF SUMMARY OF THE INVENTION

A detailed description is given in the following embodiments with reference to the accompanying drawings.

The invention provides an electronic device comprising a housing, a pillar and a fixing unit. The housing comprises a side-wall, an opening and a first positioning portion, wherein the opening is formed on the side-wall, and the first positioning portion is disposed in the housing corresponding to the side-wall. The fixing unit comprises an arm and a second positioning portion, wherein the pillar is disposed on the arm, the second positioning portion is disposed on an end of the arm, the pillar is inserted into the opening to prevent the fixing unit from moving in a first direction and a second direction, the first direction perpendicular to the second direction, and when the fixing unit is in a fixing orientation, the second positioning portion contacts the first positioning portion, the first positioning portion prevents the fixing unit from moving in a third direction, the third direction perpendicular to the first and second directions.

In an embodiment of the invention, the fixing unit wedges the first positioning portion, fixing the fixing unit without bolt or thermal welding. The pillar is easily assembled, and assembly time and cost are reduced.

BRIEF DESCRIPTION OF THE DRAWINGS

The invention can be more fully understood by reading the subsequent detailed description and examples with references made to the accompanying drawings, wherein:

FIG. 1b is an enlarged view of portion A of FIG. 1a;

FIG. 2b is an enlarged view of portion B of FIG. 2a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best-determined by reference to the appended claims.

Figure 1A:
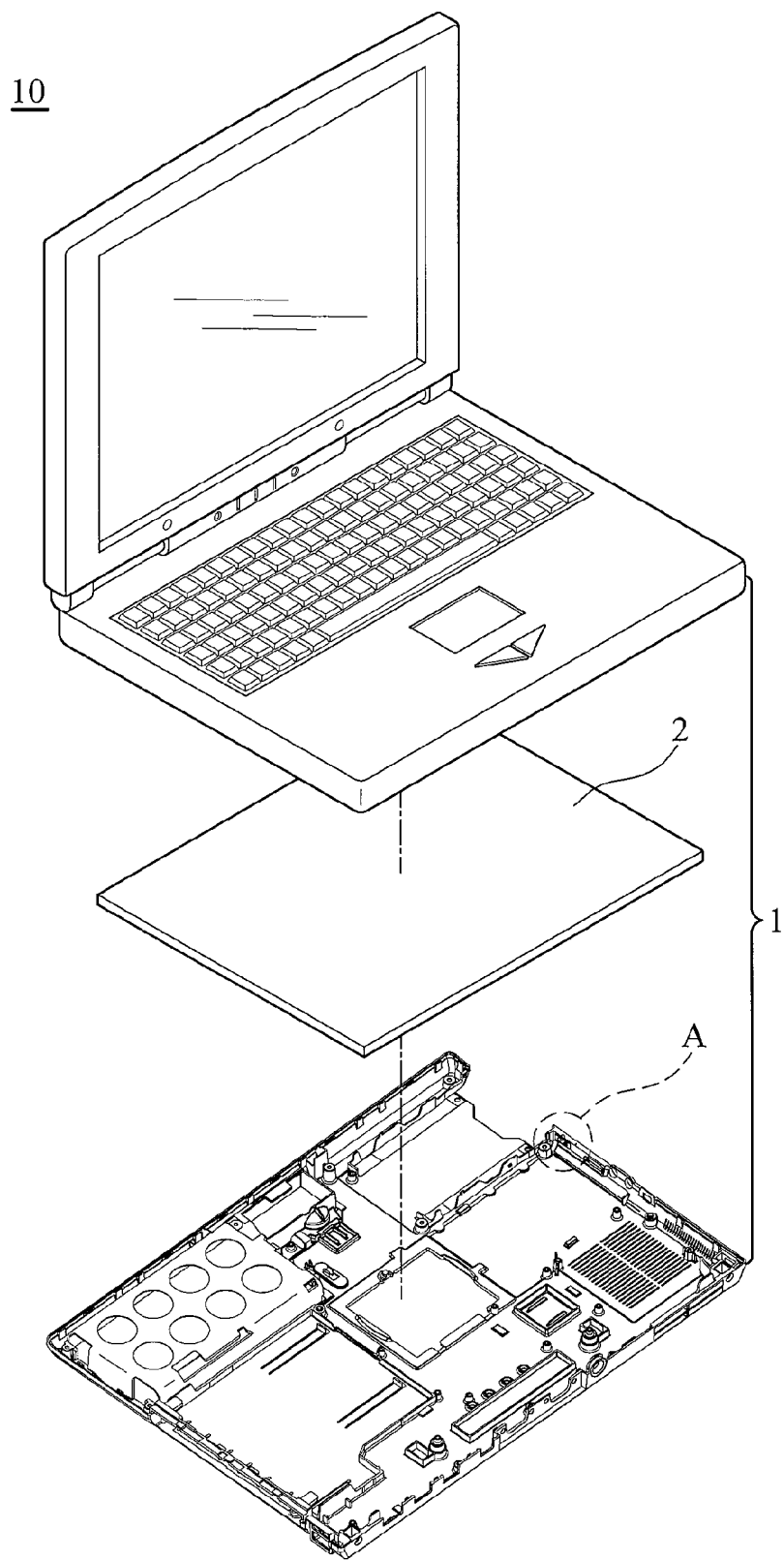
FIG. 1a shows a conventional electronic device.
Figure 1B:
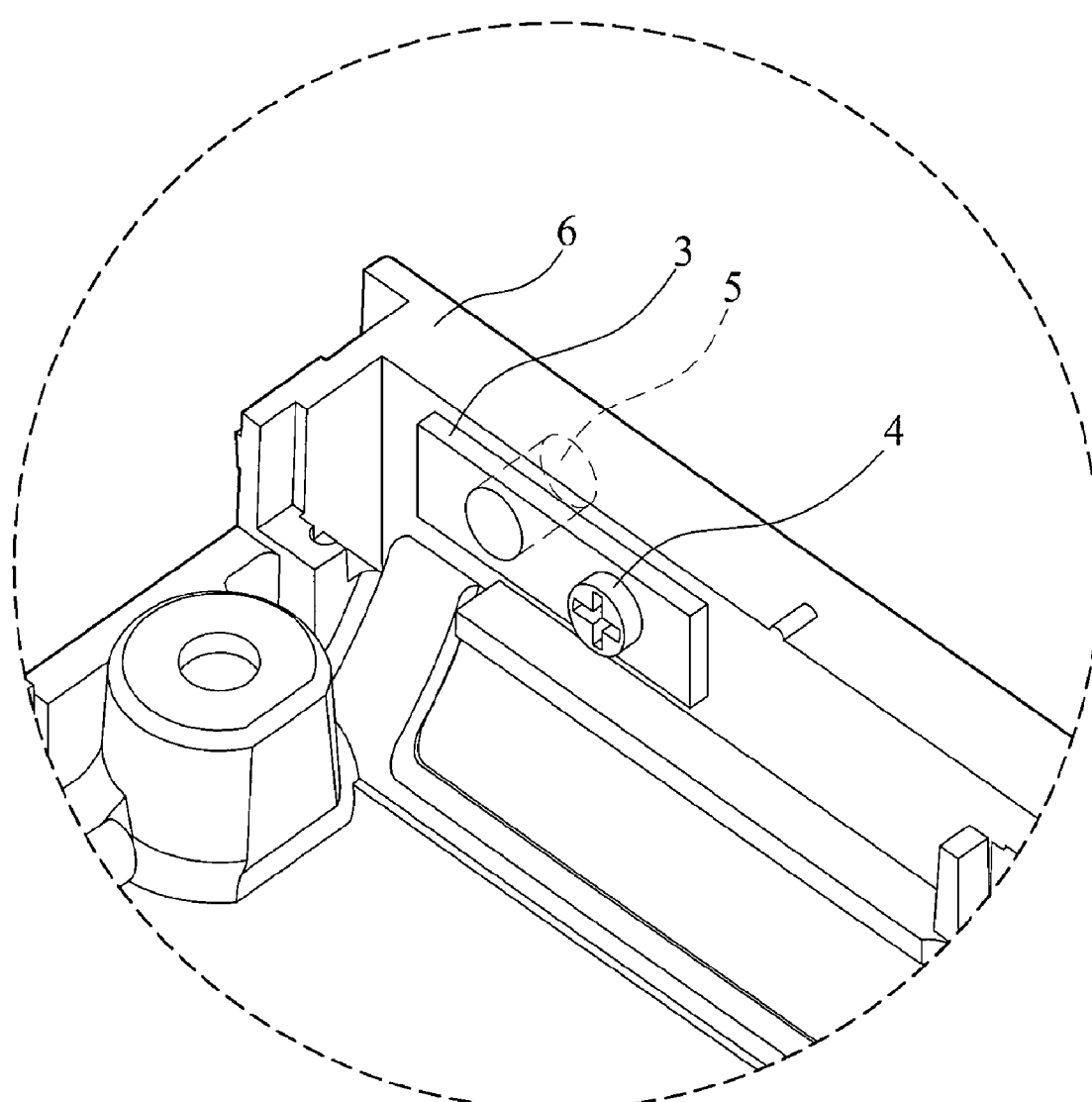
Figure 1C:
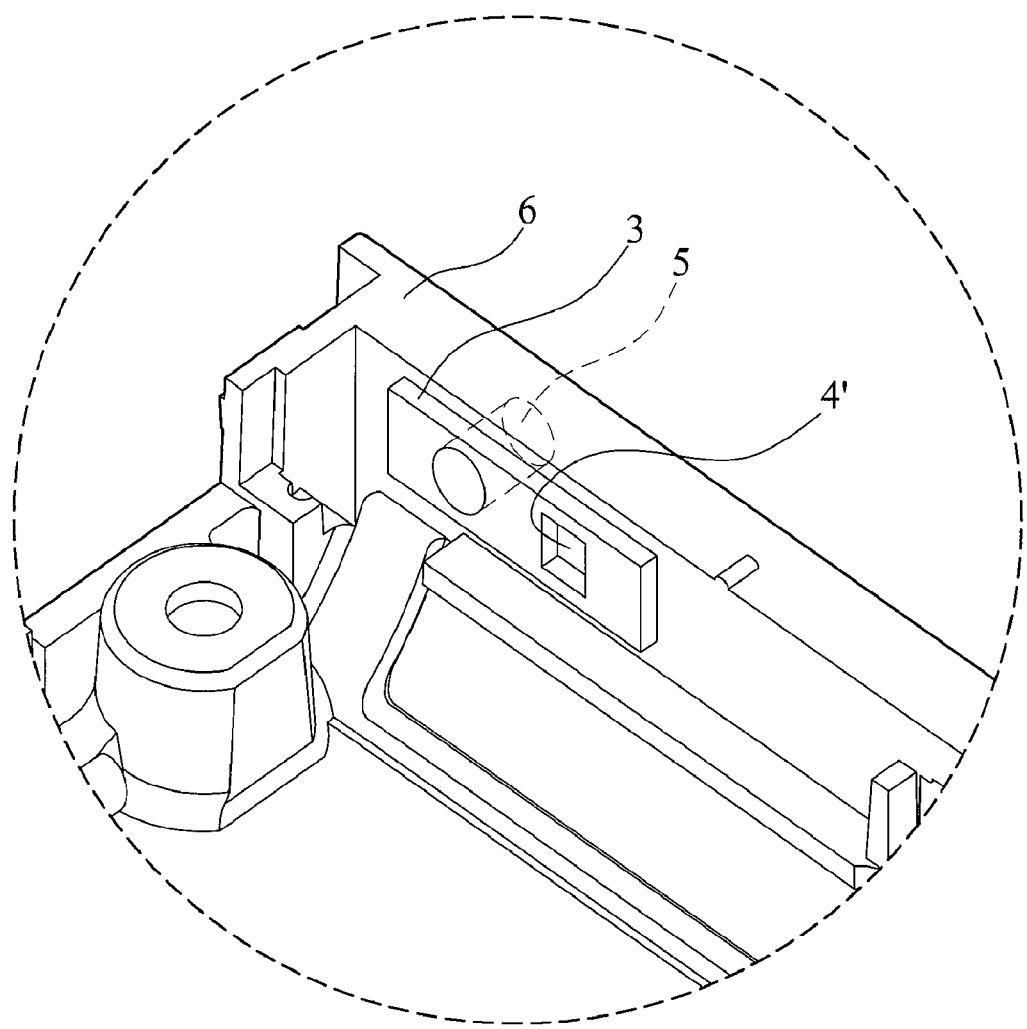
FIG. 1c shows an another structure for fixing a pillar on a side-wall.
Figure 2A:
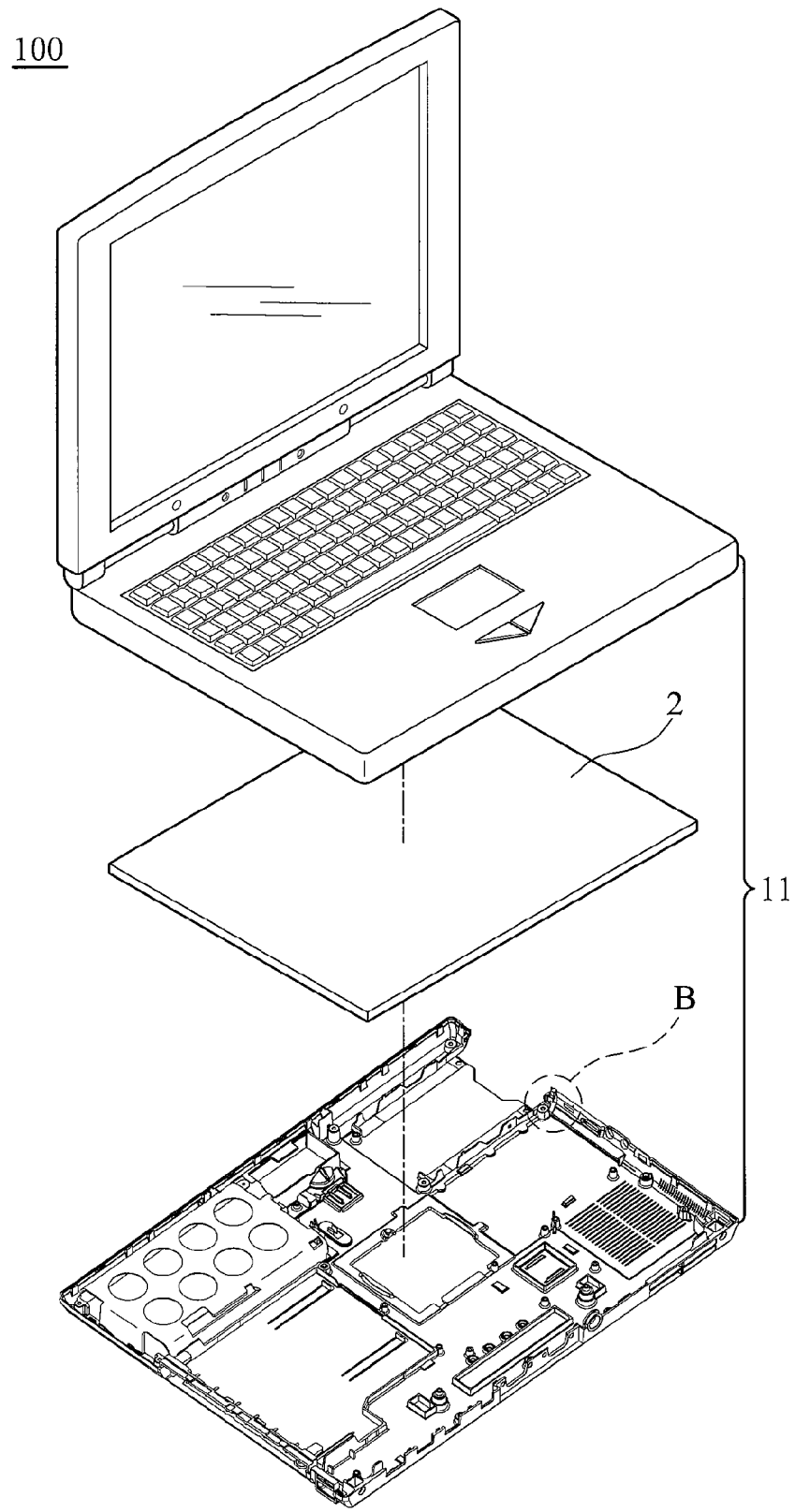
FIG. 2a shows an electronic device of the invention.
Figure 2B:
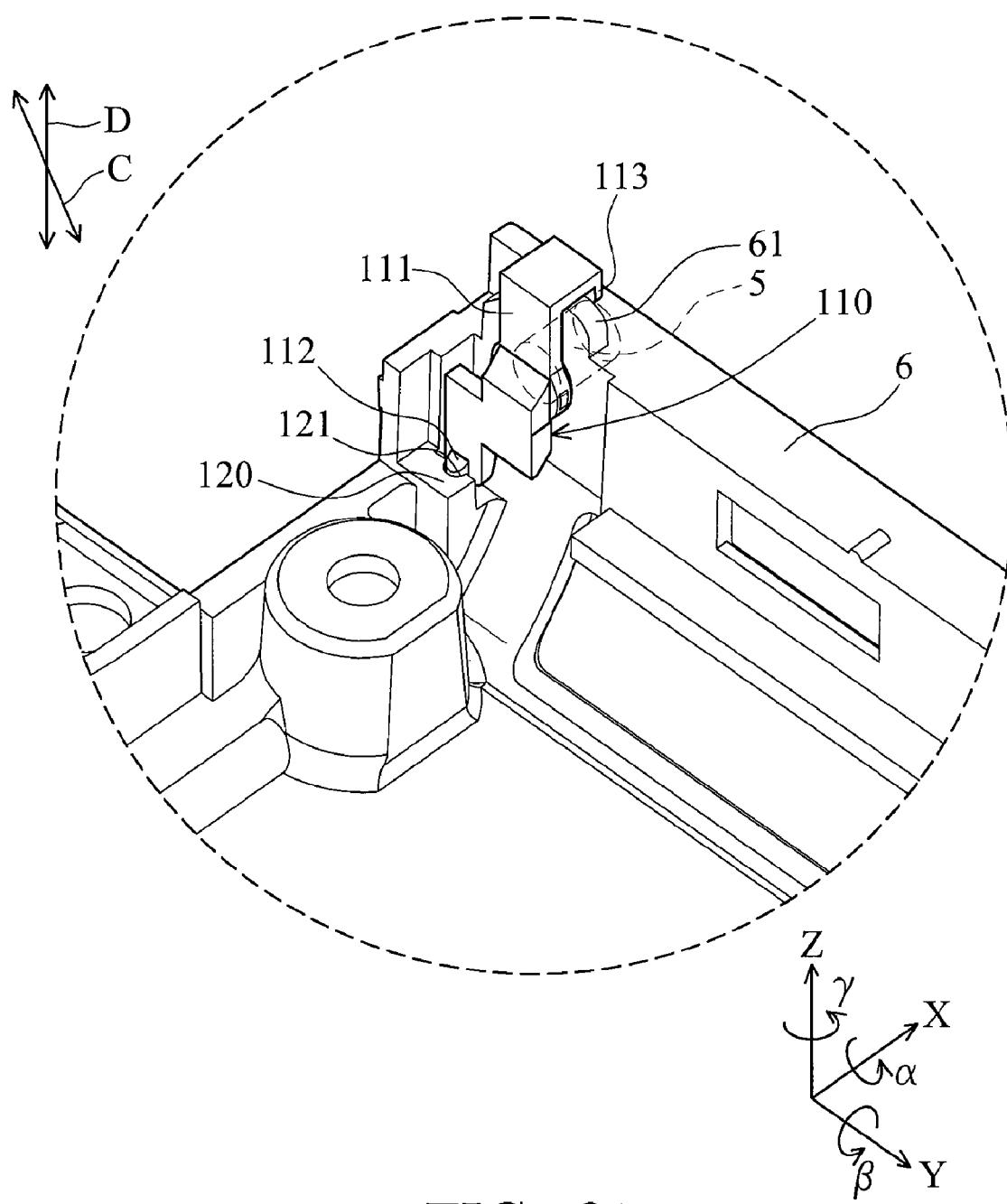

FIG. 2a shows an electronic device 100 of the invention comprising a housing 11 and a circuit board 2. The circuit board 2 is disposed in the housing 11. FIG. 2b is an enlarged view of portion B of FIG. 2a, wherein the electronic device 100 further comprises a fixing unit 110 and a pillar 5. The pillar 5 is a lamp comprising a light source therein, disposed on the fixing unit 110, and passing a side-wall 6 of the housing 11. The housing 11 comprises a first positioning portion 120 disposed on an inner bottom of the housing 11. The fixing unit 110 wedges the first positioning portion 120.

In an embodiment of the invention, the fixing unit 110 wedges the first positioning portion 120, fixing the fixing unit 110 without bolt or thermal welding. The pillar 5 is easily assembled, and assembly time and cost are reduced.

Figure 3A:
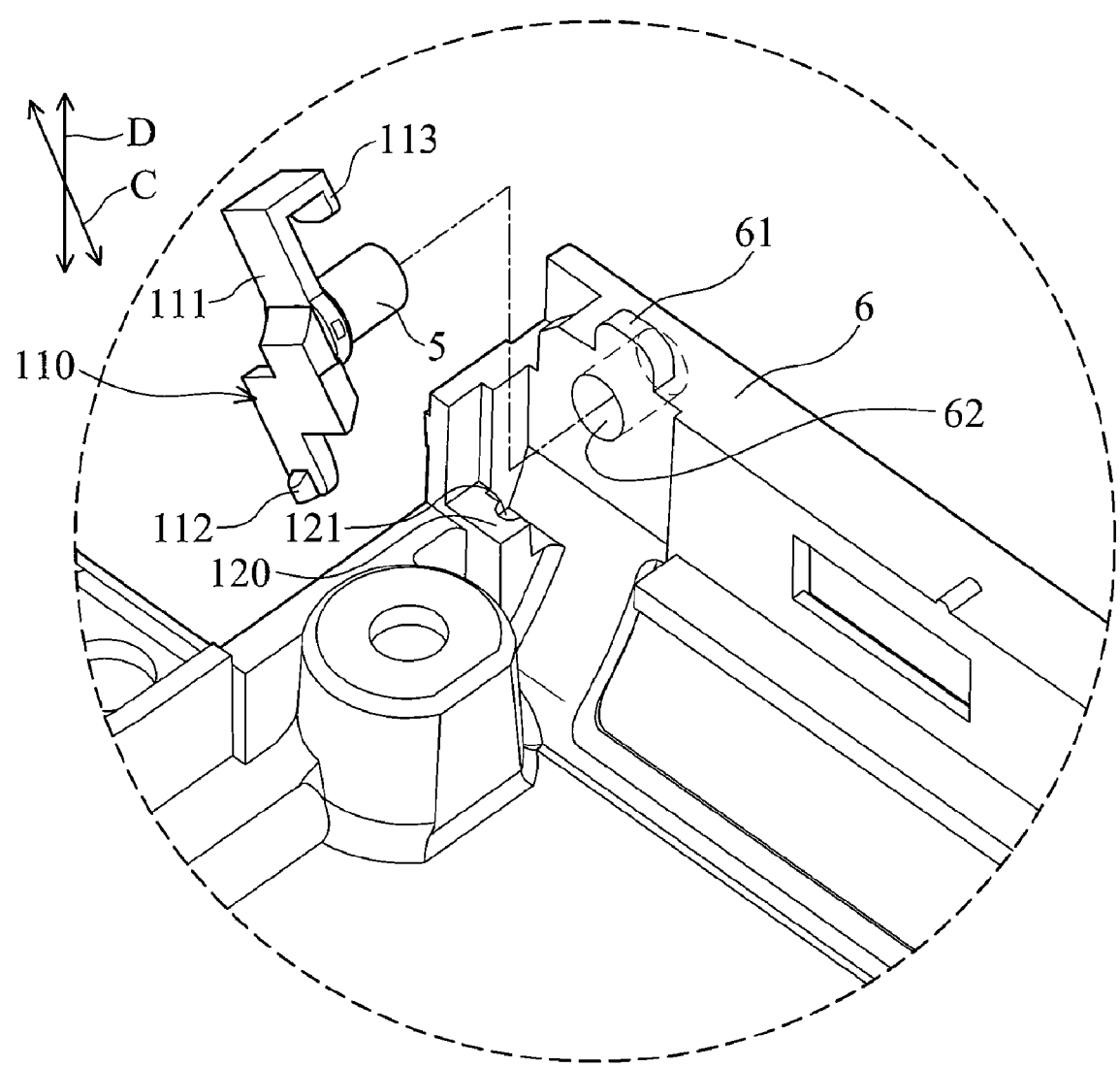
FIG. 3a shows a fixing unit before assembly.
Figure 3B:
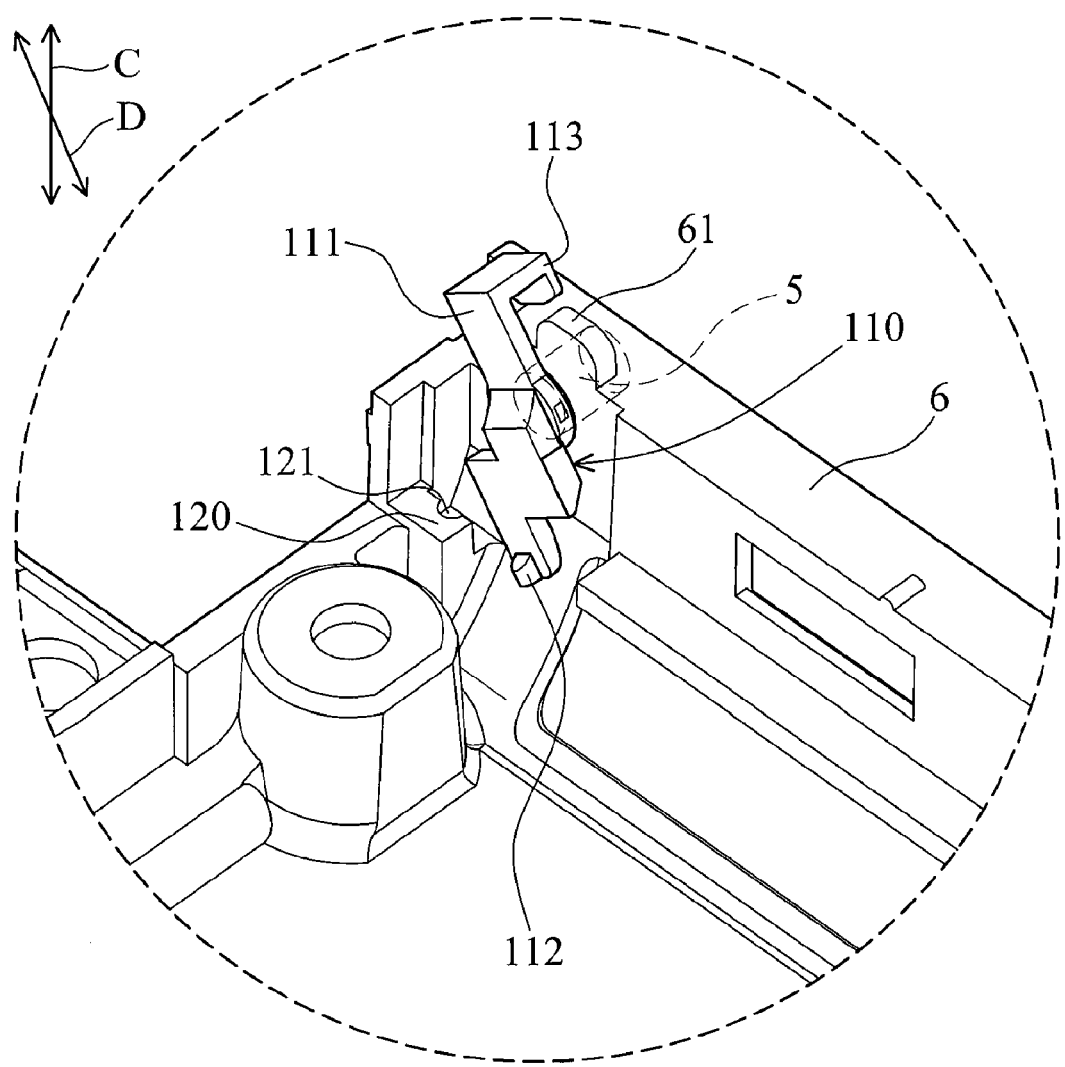
FIG. 3b shows the fixing unit in a first orientation.

FIG. 3a shows detailed structure of the fixing unit 110. Side-wall 6 comprises a protrusion 61 and an opening 62 disposed thereon. The first positioning portion 120 comprises a notch 121. The fixing unit 110 comprises an arm 111, a second positioning portion 112 and a third positioning portion 113. The second positioning portion 112 and the third positioning portion 113 are disposed on two ends of the arm 111. The second positioning portion 112 is a protuberance, and the third positioning portion 113 is L-shaped. The pillar 5 is partially embedded in the fixing unit 110. When assembling the fixing unit 110 to the side-wall, the fixing unit 110 is first rotated to a first orientation C to prevent the third positioning portion 113 from contacting the protrusion 61. Then, with reference to FIG. 3b, pillar 5 is inserted into the opening 62, and the fixing unit 110 contacts the side-wall 6. Finally, with reference to FIG. 2b, the fixing unit 110 is rotated from the first orientation C to a second orientation D (fixing orientation), wherein the second positioning portion 112 wedges the notch 121 of the first positioning portion 120, and the third positioning portion 113 wedges the protrusion 61. The movement of the fixing unit 110 in a first direction Y and a second direction Z is prevented by the pillar 5 in the opening 62, and the rotation of the fixing unit 110 in a fourth direction $\beta$ and a fifth direction $\gamma$ is further prevented at the same time. The movement of the fixing unit 110 in a third direction X and the rotation thereof in a sixth direction $\alpha$ are prevented via wedging the second positioning portion 112 to the first positioning portion 120. Thus, the invention assembles the pillar 5 on the side-wall 6 via the fixing unit 110 and the first positioning portion 120.

Figure 4:
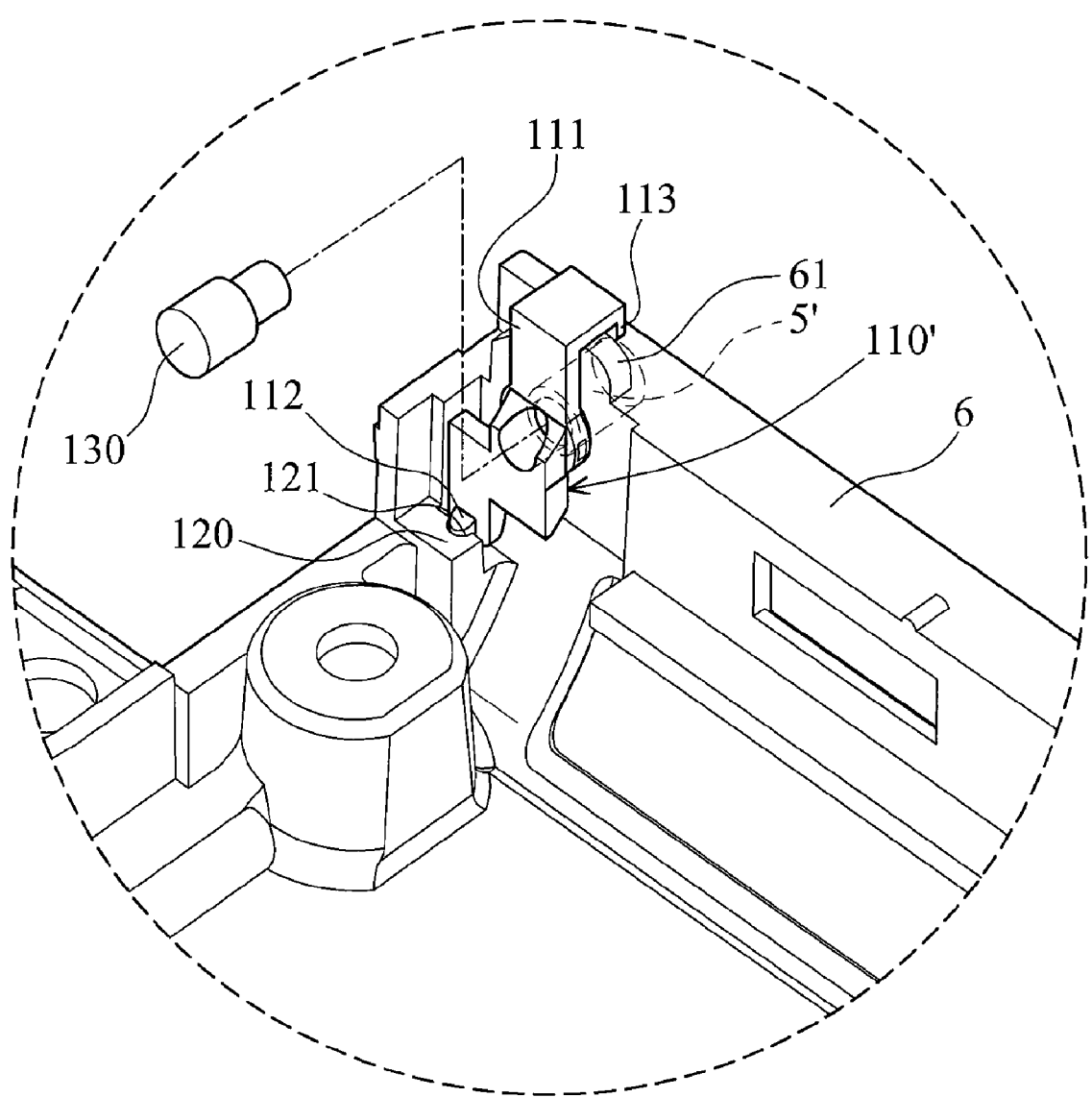
FIG. 4 shows a modified embodiment of the invention.

FIG. 4 shows a modified embodiment of the invention, which comprises a fixing unit 110' for fixing a button (pillar) 5'. The button 5' is integrally formed on the arm 111 of the fixing unit 110'. A switch 130 corresponds to the button 5'. When user pushes the button 5', the button 5' actives the switch 130.

The invention assembles the pillar on the side-wall via the fixing unit and the first positioning portion in a convenient and fast manner.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a housing, comprising a side-wall, an opening, and a first positioning portion, wherein the opening is formed on the side-wall, and the first positioning portion is disposed in the housing corresponding to the side-wall;

a pillar; and a fixing unit, comprising an arm and a second positioning portion, wherein the pillar is disposed on the arm, the second positioning portion is disposed on an end of the arm, the pillar is inserted into the opening to prevent the fixing unit from moving in a first direction and a second direction, the first direction perpendicular to the second direction, and when the fixing unit is in a fixing orientation, the second positioning portion contacts the first positioning portion, the first positioning portion prevents the fixing unit from moving in a third direction, and the third direction perpendicular to the first and second directions, wherein the housing further comprises a protrusion disposed on the side-wall, and the fixing unit further comprises a third positioning portion, and when the fixing unit is in the fixing orientation, the third positioning portion wedges the protrusion.

2. The electronic device as claimed in claim 1, wherein when the fixing unit is in the fixing orientation, the second positioning portion wedges the first positioning portion.

3. The electronic device as claimed in claim 2, wherein the first positioning portion comprises a notch, the second positioning portion comprises a protuberance, and when the fixing unit is in the fixing orientation, the protuberance wedges the notch.

4. The electronic device as claimed in claim 1, wherein the pillar is a lamp, comprising a light source disposed therein.

5. The electronic device as claimed in claim 1, wherein the pillar is a button.

6. The electronic device as claimed in claim 5, wherein the pillar is integrally formed on the arm.

7. The electronic device as claimed in claim 5, further comprising a switch, disposed in the housing corresponding to the pillar, wherein when a user pushes the pillar, the pillar actives the switch.

8. The electronic device as claimed in claim 1, wherein the third positioning portion is L-shaped and disposed on another end of the arm.

* * * * *